United States Patent
Sato

(10) Patent No.: US 11,364,812 B2
(45) Date of Patent: Jun. 21, 2022

(54) CONTROL APPARATUS AND CONTROL SYSTEM FOR HYBRID VEHICLE

(71) Applicant: TOYOTA JIDOSHA KABUSHIKI KAISHA, Toyota (JP)

(72) Inventor: Masahiro Sato, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 291 days.

(21) Appl. No.: 16/159,068

(22) Filed: Oct. 12, 2018

(65) Prior Publication Data

US 2019/0126771 A1 May 2, 2019

(30) Foreign Application Priority Data

Oct. 31, 2017 (JP) .............................. JP2017-210365

(51) Int. Cl.
| | |
|---|---|
| *B60L 58/12* | (2019.01) |
| *B60W 10/08* | (2006.01) |
| *B60L 15/20* | (2006.01) |
| *B60W 10/26* | (2006.01) |
| *B60L 50/16* | (2019.01) |

(Continued)

(52) U.S. Cl.
CPC ........... *B60L 58/12* (2019.02); *B60L 15/2045* (2013.01); *B60L 50/16* (2019.02); *B60L 50/61* (2019.02);

(Continued)

(58) Field of Classification Search
CPC .......... B60L 58/12; B60L 50/16; B60L 50/61; B60L 58/13; B60L 15/2045; B60L 2240/70; B60L 2240/80; B60L 2260/50; B60W 10/08; B60W 10/26; B60W 2510/244; Y02T 90/14; Y02T 10/70; Y02T 10/7072; Y02T 90/16; Y02T 10/72; Y02T 10/62; Y02T 10/64; B60K 1/02
See application file for complete search history.

(56) References Cited

U.S. PATENT DOCUMENTS

| | | | |
|---|---|---|---|
| 9,442,548 B1* | 9/2016 | Johansson | G06F 1/3212 |
| 2009/0101421 A1 | 4/2009 | Oyobe et al. | |
| 2009/0277702 A1 | 11/2009 | Kanada et al. | |
| 2009/0319110 A1* | 12/2009 | Tani | B60K 6/48 701/22 |

(Continued)

FOREIGN PATENT DOCUMENTS

| | | |
|---|---|---|
| JP | 2004-248455 A | 9/2004 |
| JP | 2007-062638 A | 3/2007 |

(Continued)

*Primary Examiner* — Natalie Huls
*Assistant Examiner* — Michael J Singletary
(74) *Attorney, Agent, or Firm* — Oliff PLC

(57) ABSTRACT

A control apparatus for a hybrid vehicle is applied to a hybrid vehicle capable of running in EV mode and configured to allow external charging. The control apparatus comprises a controller configured to acquire an external charging time at which charging of the battery by electrical power supplied from outside the vehicle becomes possible with the hybrid vehicle staying at a predetermined charging site and execute generation control to control electrical power generation by the electric motor using an internal combustion engine on the basis of a remaining time defined as the length of time from the current time to the time of the next external charging time, when an SOC value becomes equal to or smaller than a predetermined lower threshold. The control apparatus as above can reduce the degree of dependence on the internal combustion engine as much as possible.

7 Claims, 12 Drawing Sheets

(51) Int. Cl.
*B60L 50/61* (2019.01)
*B60L 58/13* (2019.01)
*B60K 1/02* (2006.01)

(52) U.S. Cl.
CPC ............ *B60L 58/13* (2019.02); *B60W 10/08* (2013.01); *B60W 10/26* (2013.01); *B60K 1/02* (2013.01); *B60L 2240/70* (2013.01); *B60L 2240/80* (2013.01); *B60L 2260/50* (2013.01); *B60W 2510/244* (2013.01)

(56) References Cited

U.S. PATENT DOCUMENTS

| | | | |
|---|---|---|---|
| 2013/0214730 A1* | 8/2013 | Lu ........................ | H02J 7/007 320/107 |
| 2013/0226379 A1* | 8/2013 | Hirai .................... | B60W 20/10 701/22 |
| 2013/0229154 A1* | 9/2013 | Benjamin ............ | G01R 31/367 320/132 |
| 2015/0249355 A1* | 9/2015 | Takano ................ | G01R 31/3835 |
| 2016/0242119 A1* | 8/2016 | Shedletsky ......... | H04W 52/0264 |
| 2016/0347302 A1* | 12/2016 | Niwa .................... | B60L 58/27 |
| 2018/0080995 A1* | 3/2018 | Heinen ................. | B60L 58/16 |
| 2019/0072616 A1* | 3/2019 | Matsushita ......... | G01R 31/3835 |

FOREIGN PATENT DOCUMENTS

| | | |
|---|---|---|
| JP | 2007-099223 A | 4/2007 |
| JP | 2014-092375 A | 5/2014 |

* cited by examiner

[FIG. 1]
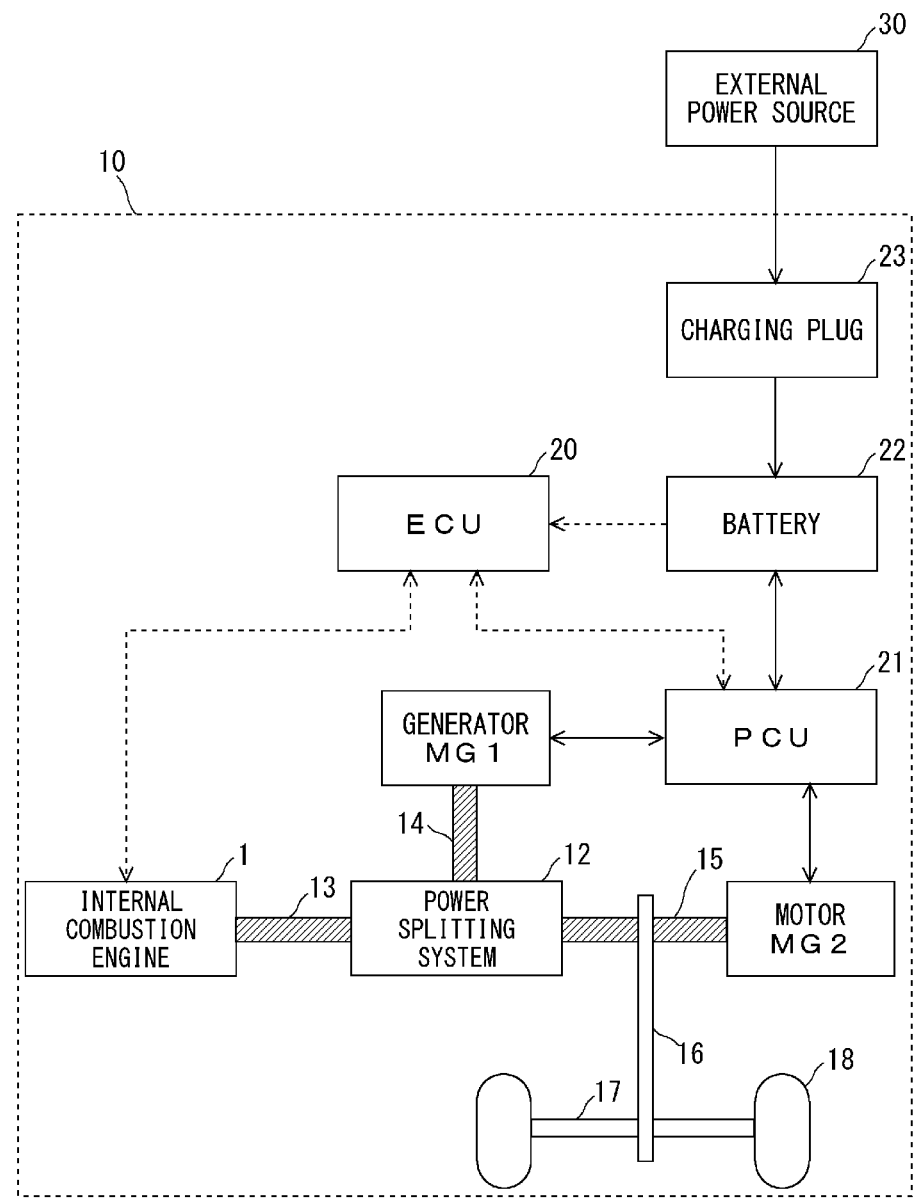

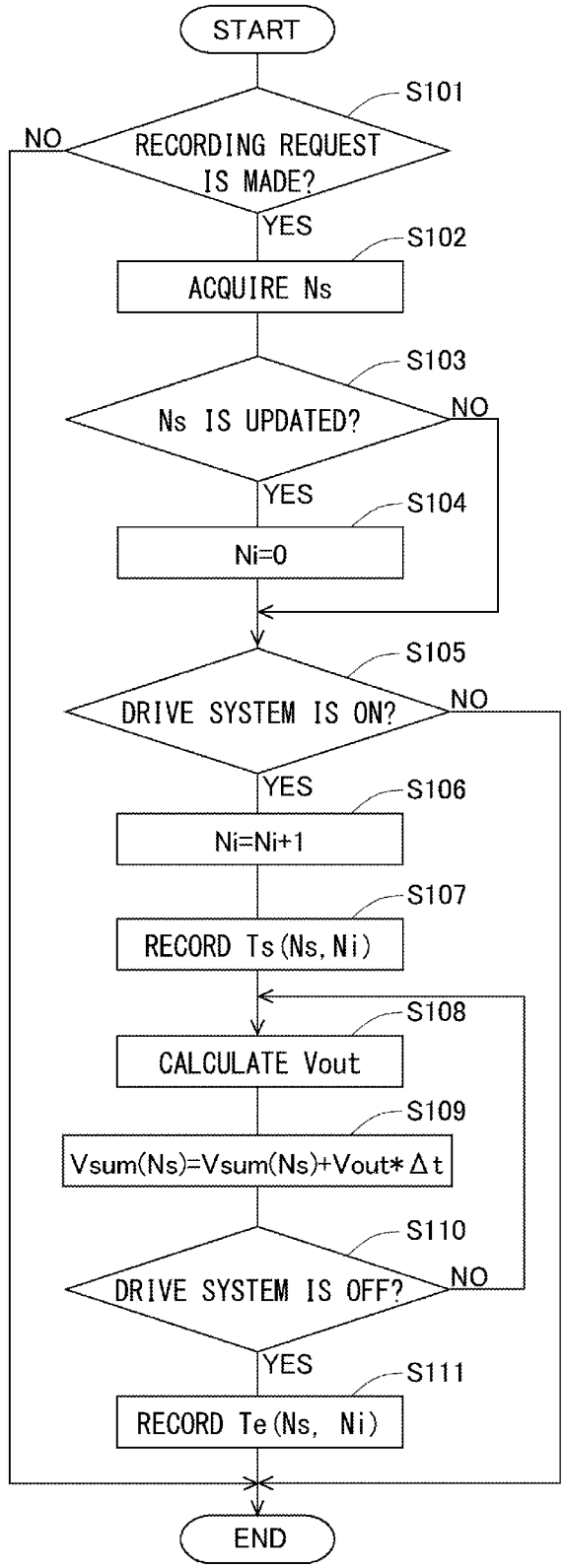
[FIG. 2]

[FIG. 3]
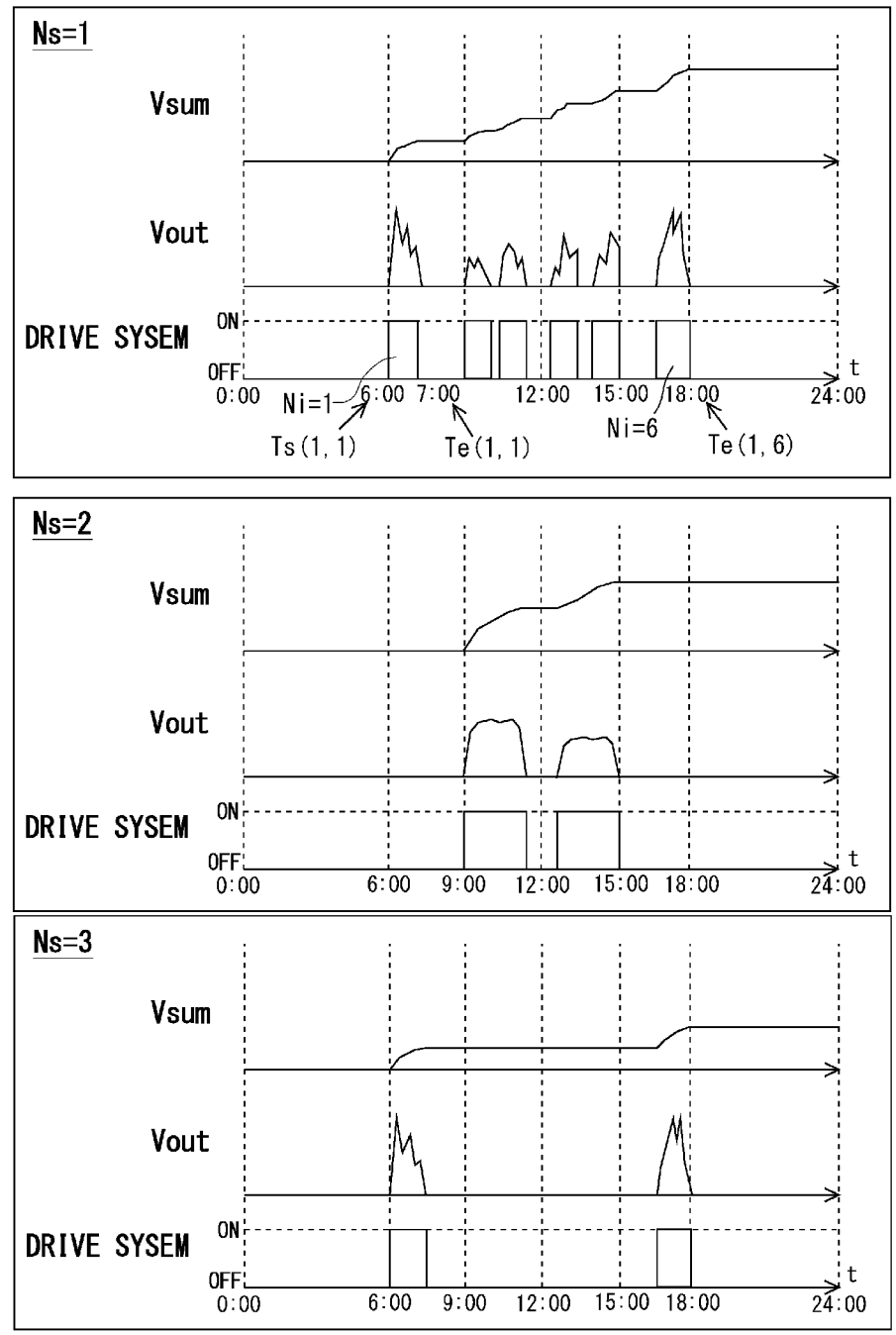

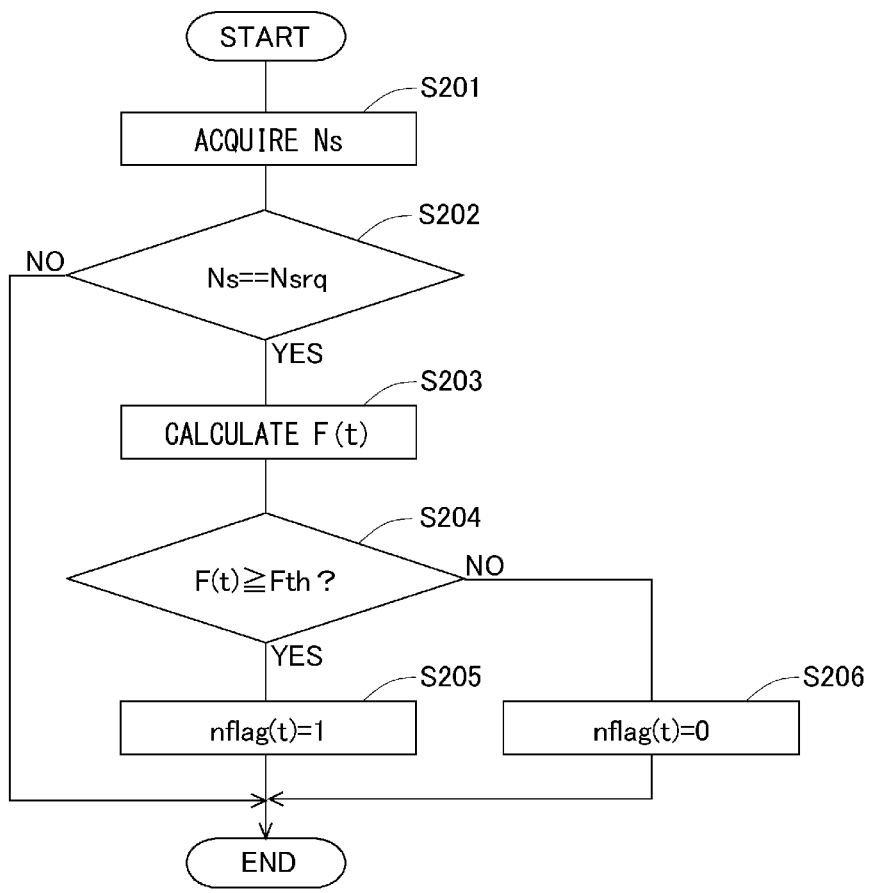
[FIG. 4]

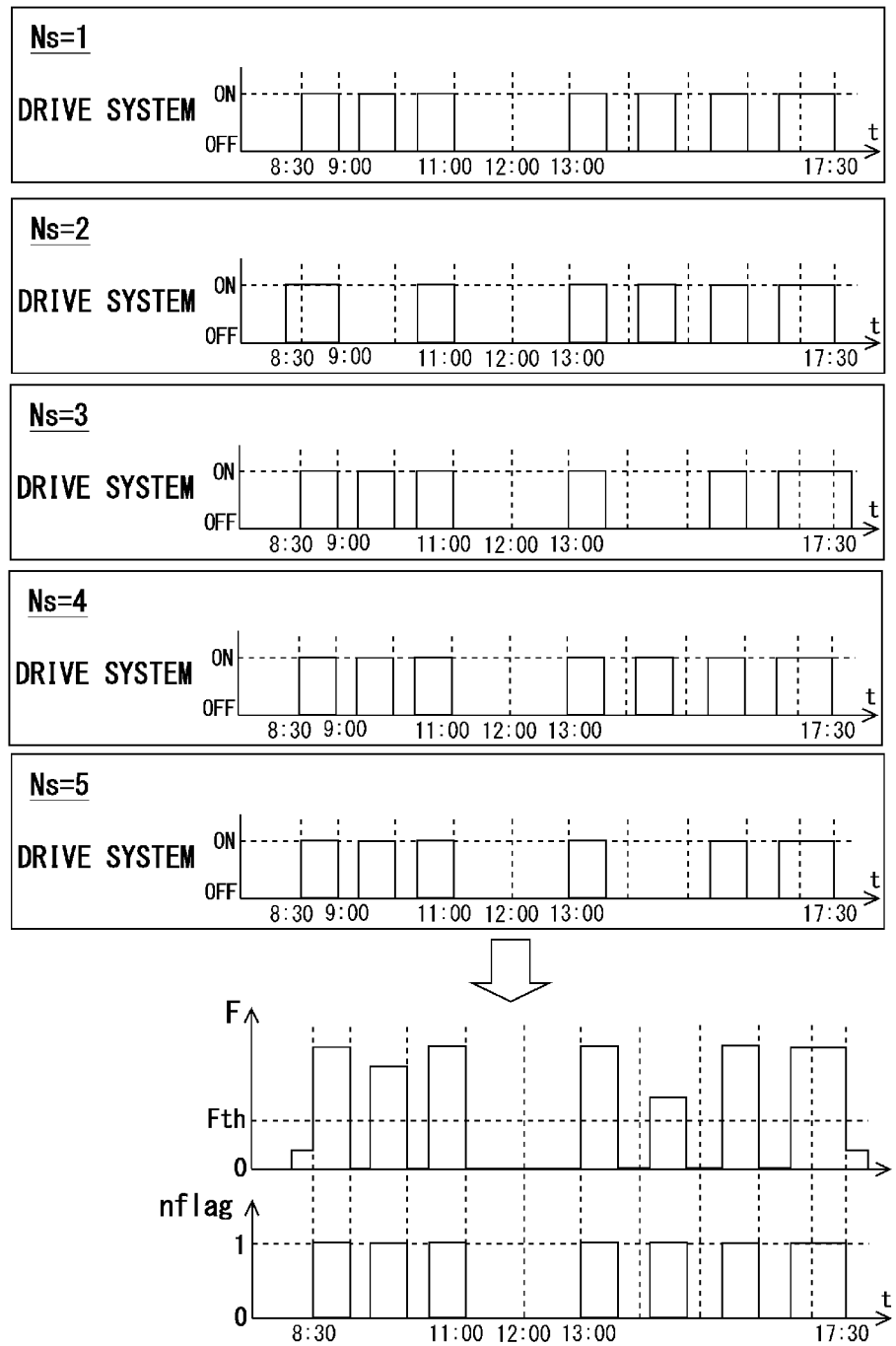
[FIG. 5]

[FIG. 6]
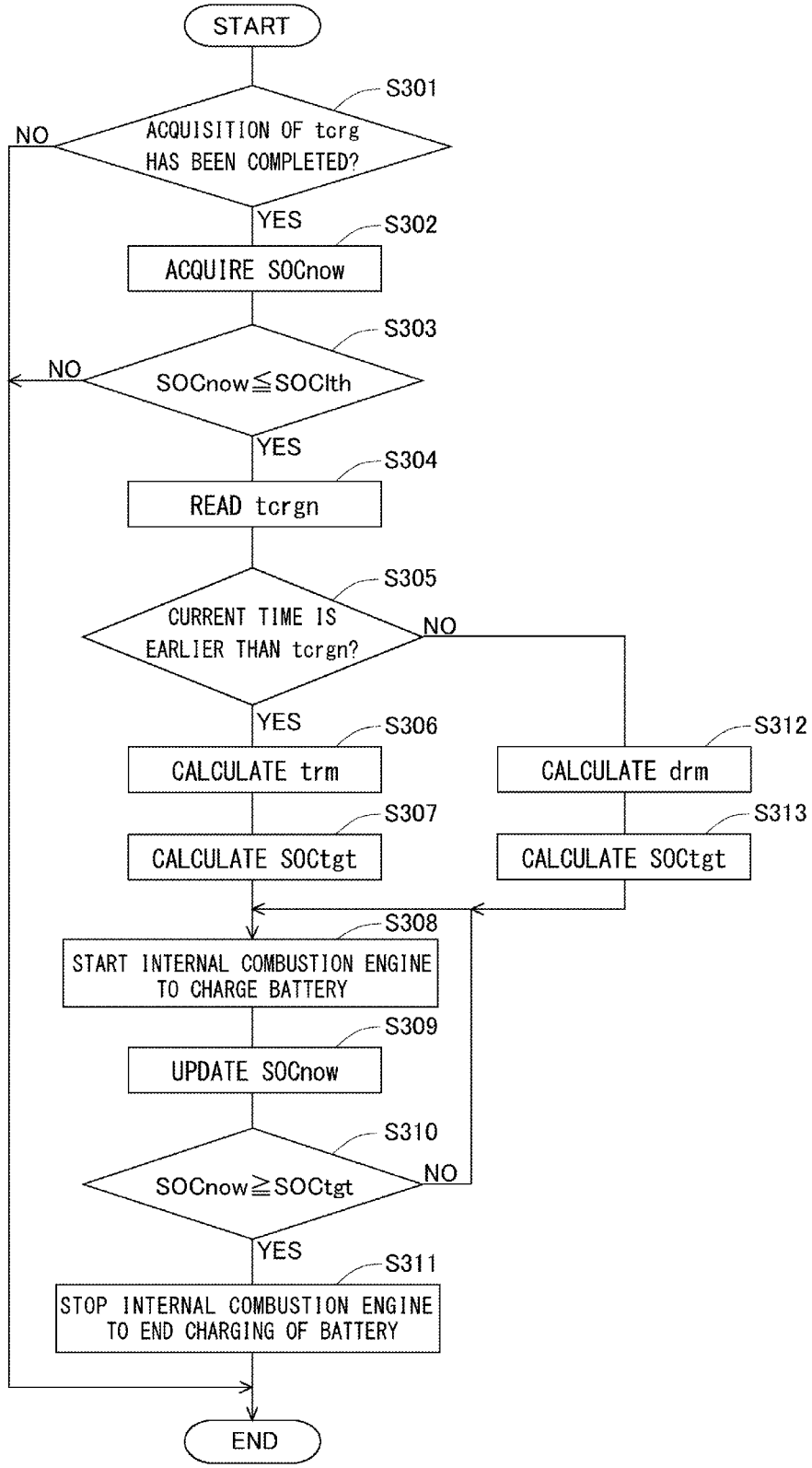

[FIG. 7]
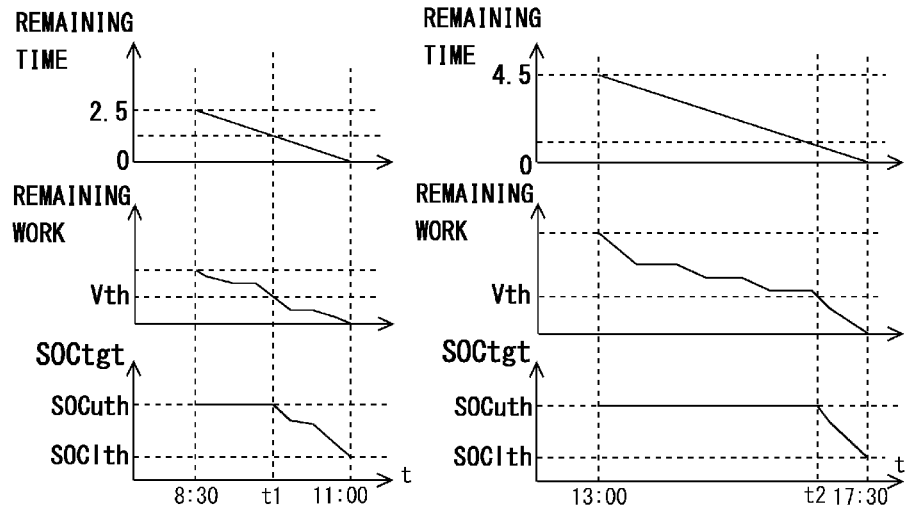
[FIG. 8]
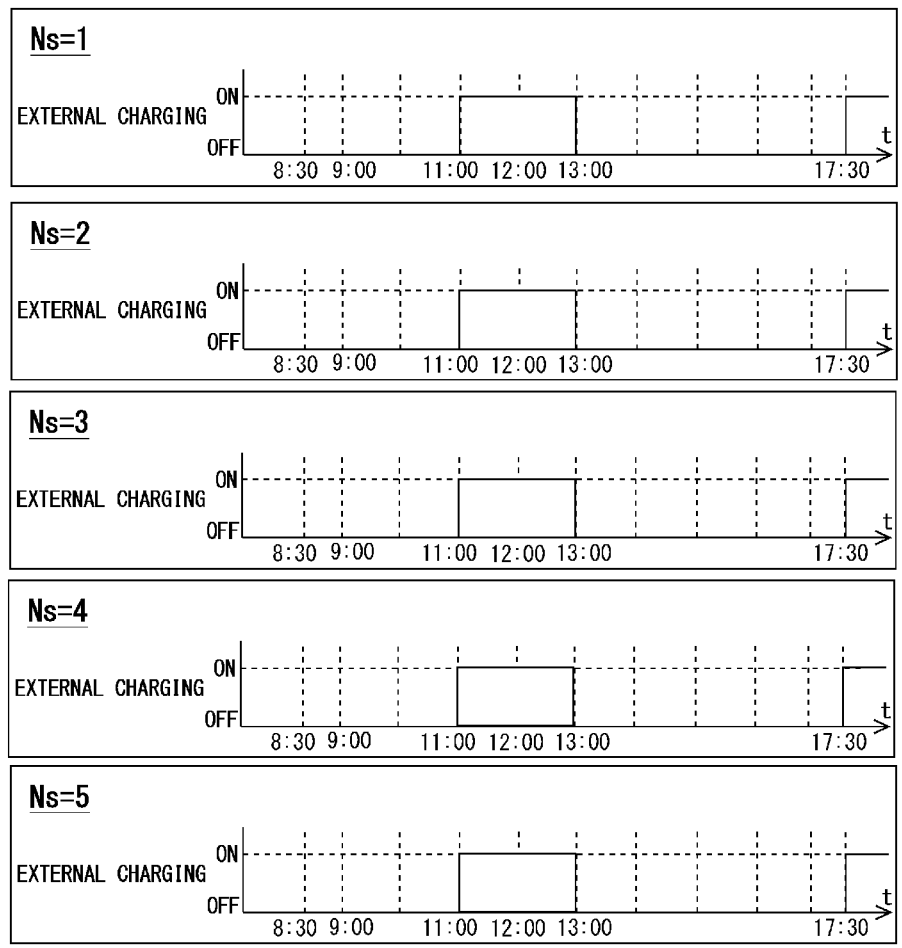

[FIG. 9]
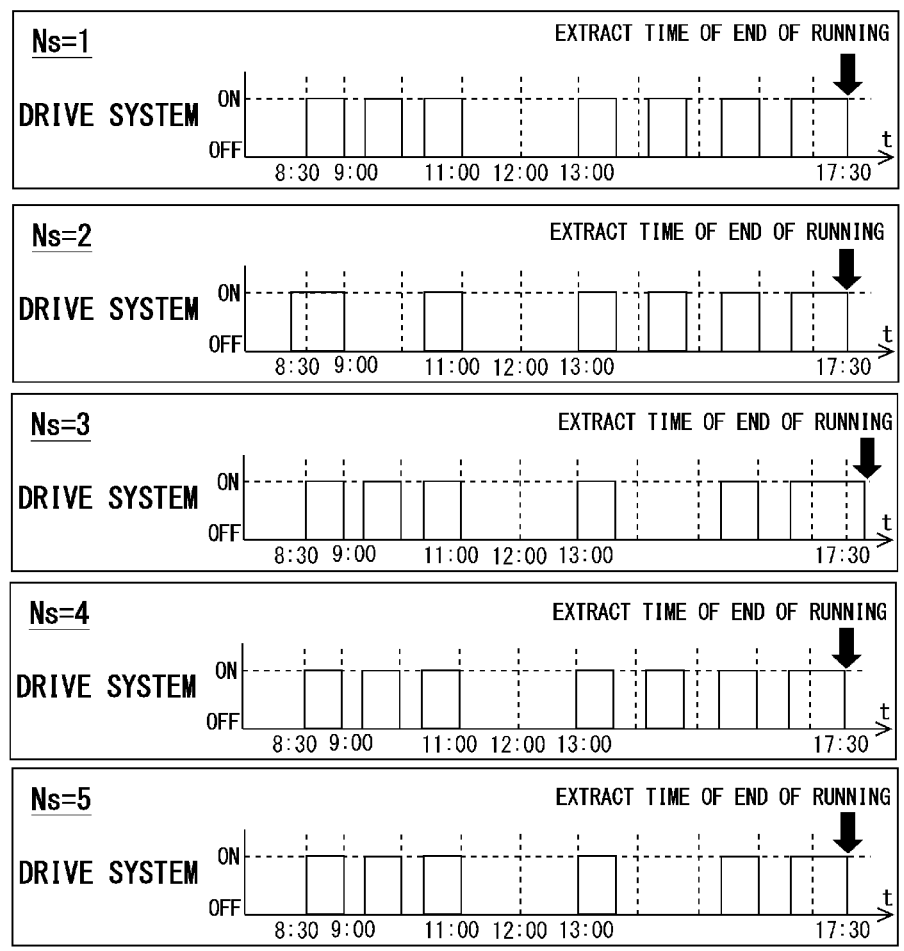

[FIG. 10]
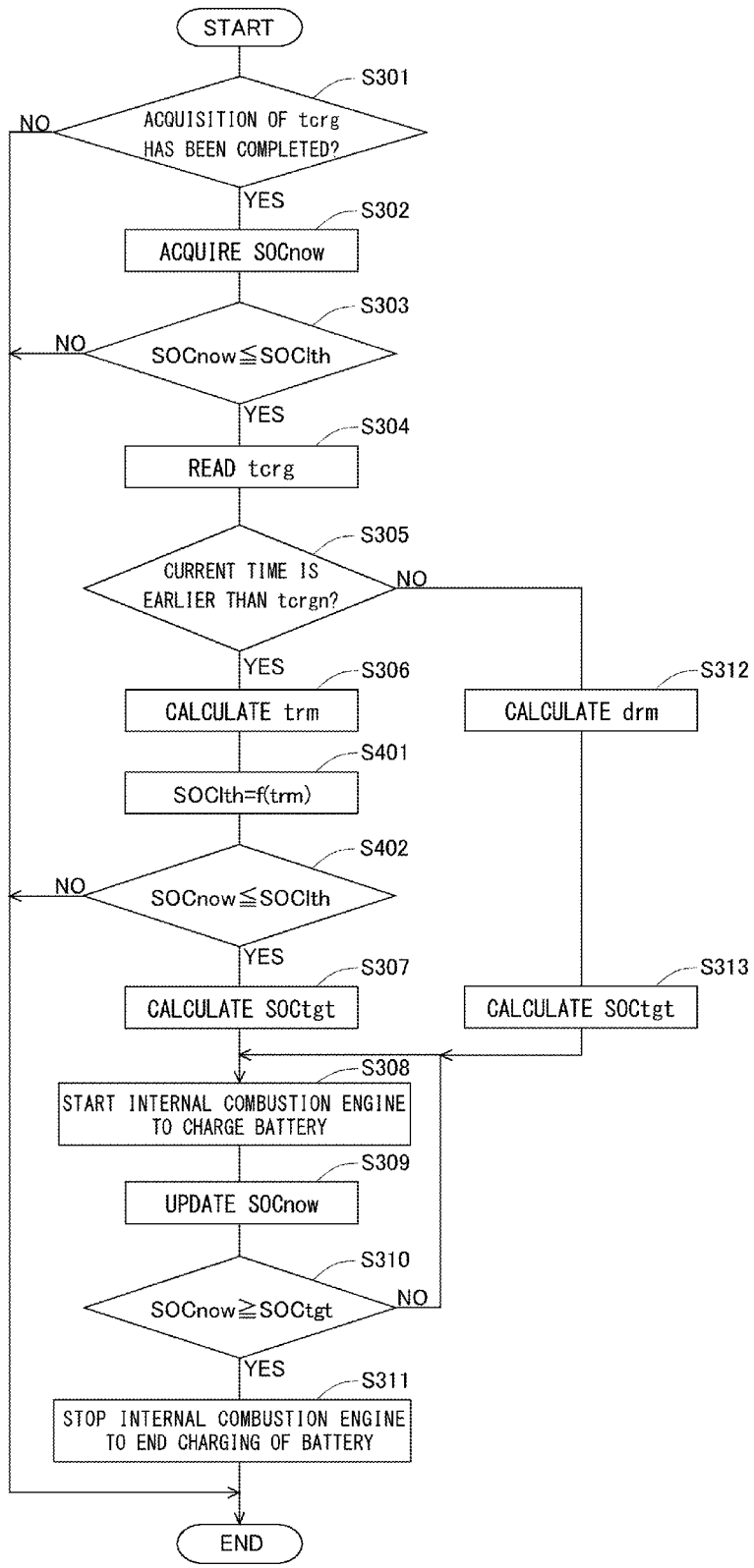

[FIG. 11]
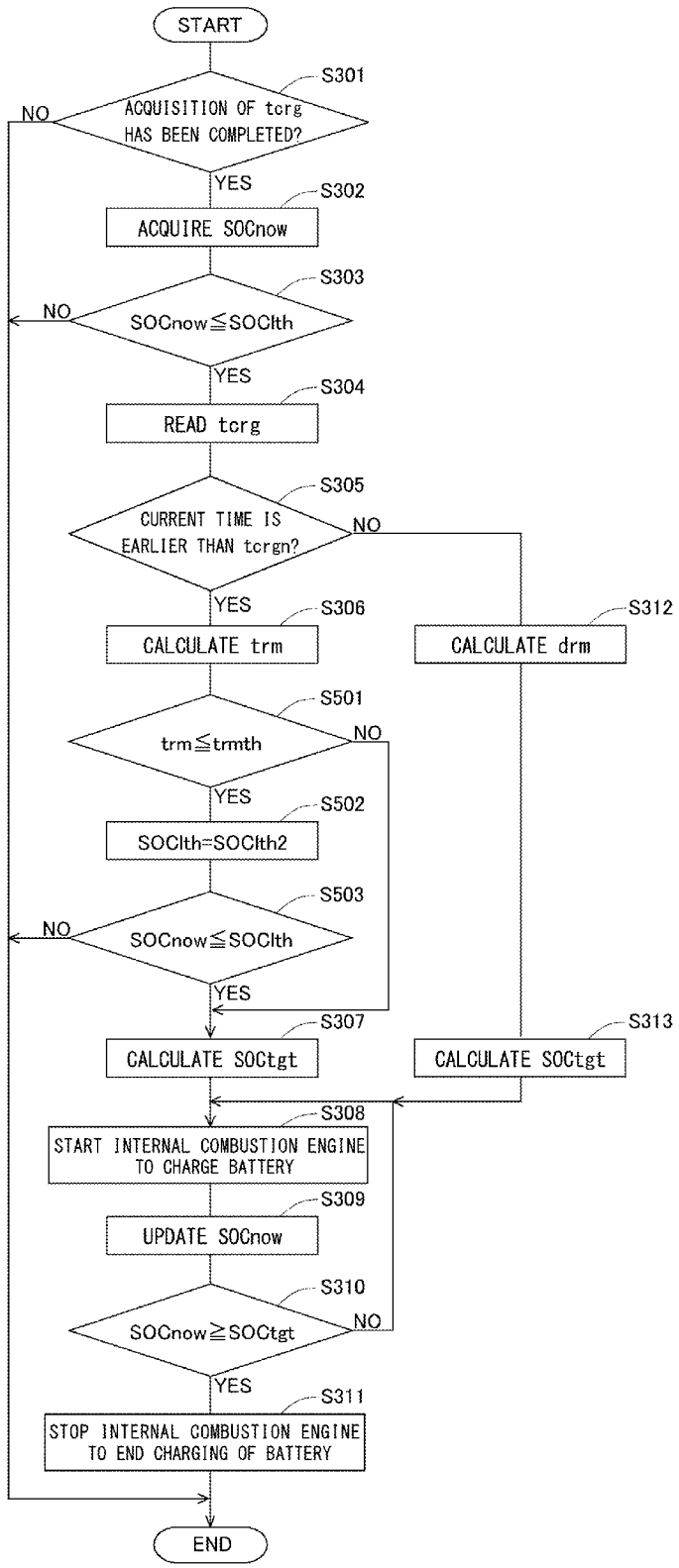

[FIG. 12A]
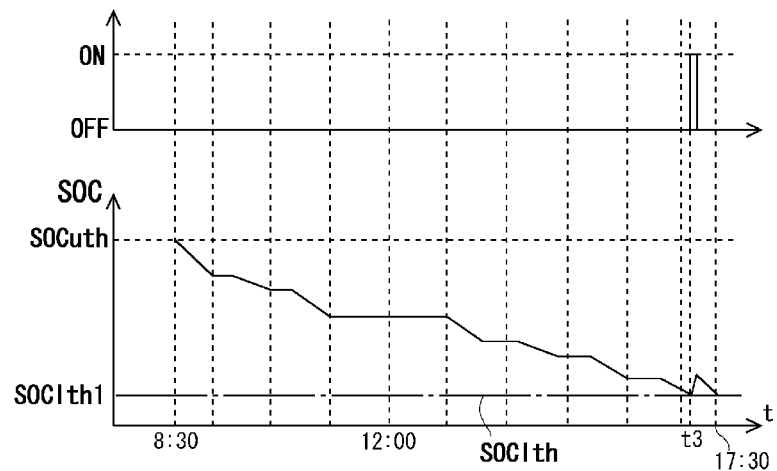
[FIG. 12B]
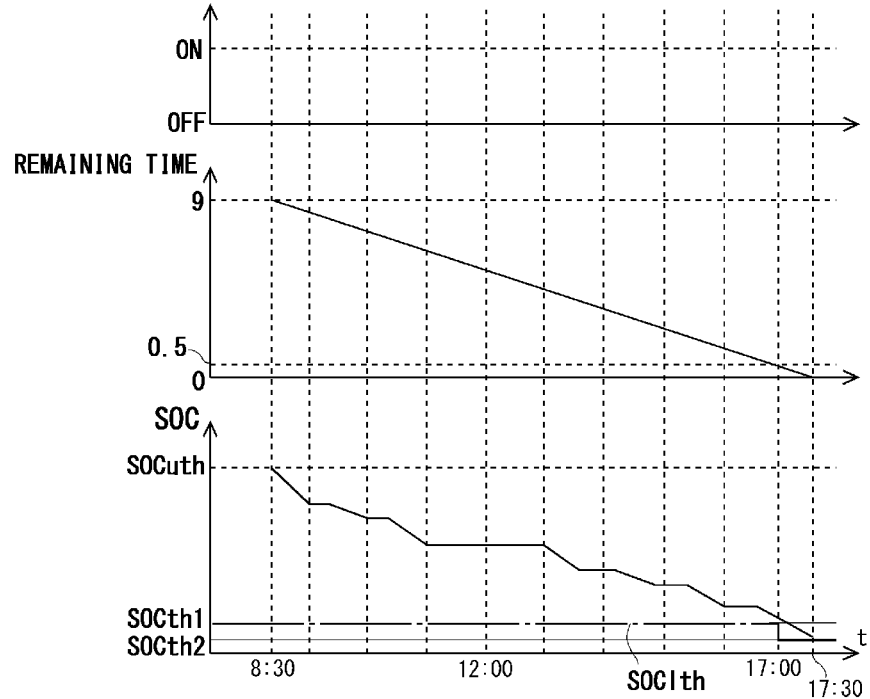

[FIG. 13]
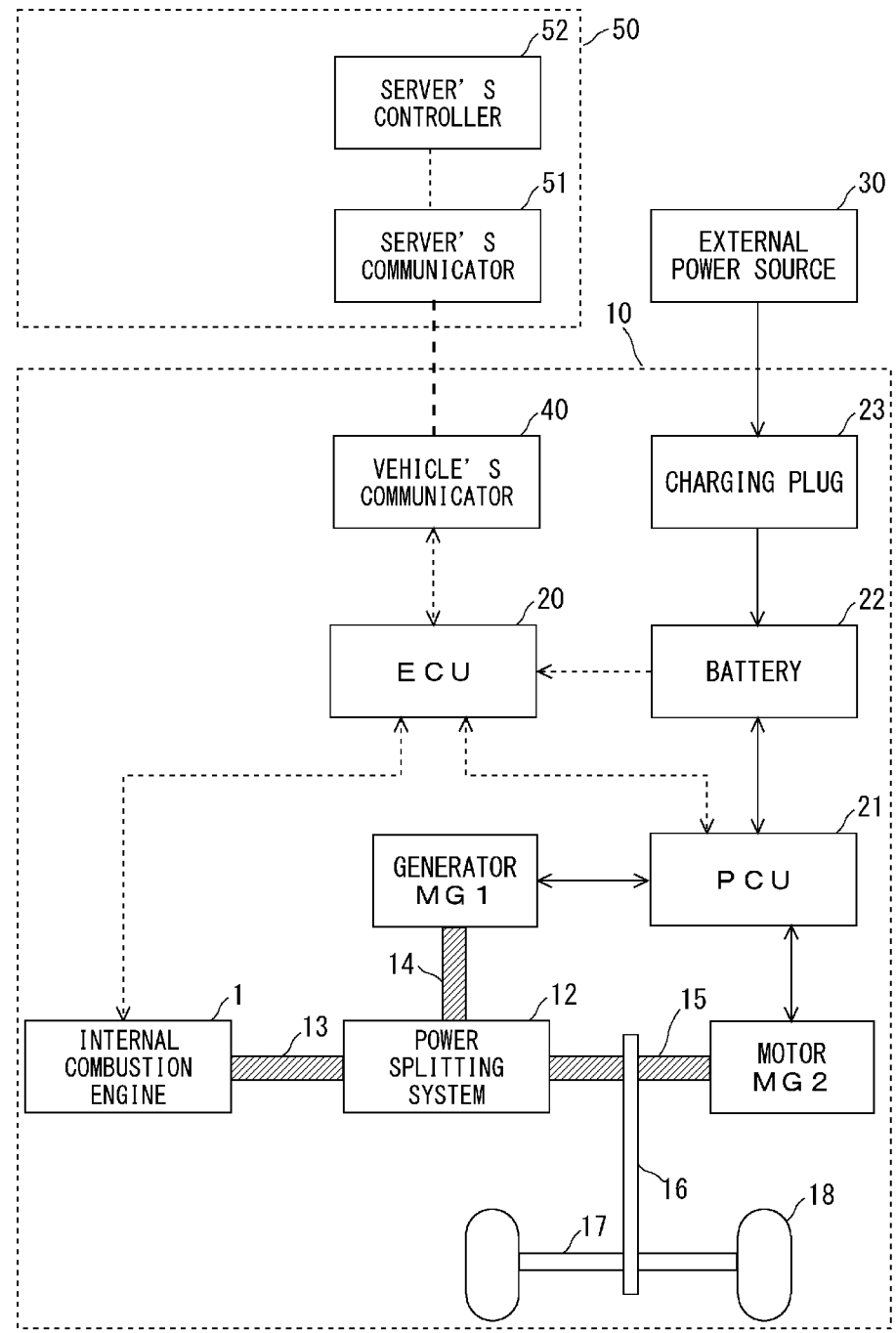

CONTROL APPARATUS AND CONTROL SYSTEM FOR HYBRID VEHICLE

CROSS-REFERENCE TO RELATED APPLICATIONS

This application claims priority to Japanese Patent Application No. 2017-210365 filed on Oct. 31, 2017, the entire contents of which are incorporated by reference.

BACKGROUND

Technical Field

The present disclosure relates to a control apparatus and control system for a hybrid vehicle.

Description of the Related Art

There are known hybrid vehicles having an external charging function, that is, the function of charging their battery by electrical power supplied from outside. The degree of dependence on the internal combustion engine in such a hybrid vehicle can be reduced by designing the vehicle to have a relatively long maximum travel distance in traveling in EV mode, in which the vehicle is driven by an electric motor with the internal combustion engine turned off.

Patent Literature 1 in the following citation list discloses a technology pertaining to hybrid vehicles having an external charging function. According to this technology, the shorter the travel distance from the current location to a predetermined charging site is, the smaller a value relating to the state of charge of the battery (which will also be referred to as the "SOC value" hereinafter) is controlled to be.

CITATION LIST

Patent Literature

Patent Literature 1: Japanese Patent Application Laid-Open No. 2007-099223
Patent Literature 2: Japanese Patent Application Laid-Open No. 2014-092375
Patent Literature 3: Japanese Patent Application Laid-Open No. 2004-248455

SUMMARY

In hybrid vehicles equipped with an internal combustion engine and an electric motor and capable of running in EV mode, in which the vehicles run by power of the electric motor with the internal combustion engine turned off, their dependence on the internal combustion engine becomes smaller when they are running with the internal combustion engine turned off (namely, when they are running in EV mode).

If the SOC value is set according to the distance between the current location of the vehicle and an external charging site as taught by the prior art, the SOC value is set relatively small when the vehicle is running in the neighborhood of the external charging site. Then, if the vehicle continues running without returning to the external charging site, the SOC value is prone to decrease to its lower threshold, likely leading to frequent start and stop of the internal combustion engine. This increases the dependence on the internal combustion engine.

Since control of the SOC value based on the distance involves the above-described problem, a technique of controlling the SOC value taking account not only of the distance but also a parameter(s) other than the distance has been wanted.

The present disclosure has been made to solve the above problem, and an object of the present disclosure is to reduce the dependence on the internal combustion engine as much as possible.

Solution to Problem

A hybrid vehicle to which the present disclosure is applied is capable of running in EV mode and configured to allow external charging. A control apparatus for a hybrid vehicle according to the present disclosure performs generation control to control electrical power generation by an electric motor using an internal combustion engine on the basis of a remaining time defined as the length of time from the current time to the time of next external charging.

More specifically, there is provided a control apparatus for a hybrid vehicle applied to a hybrid vehicle provided with an internal combustion engine and an electric motor, capable of running by driving force generated by said electric motor with said internal combustion engine turned off, capable of charging a battery by electrical power from said electric motor by driving said electric motor by said internal combustion engine, and configured in such a way that the battery can be charged by electrical power supplied from outside the vehicle. The control apparatus comprises a controller comprising at least one processor configured to acquire an external charging time at which charging of the battery by electrical power supplied from outside the vehicle becomes possible with the hybrid vehicle staying at a predetermined charging site, and execute generation control to control electrical power generation by said electric motor using said internal combustion engine on the basis of a remaining time defined as the length of time from the current time to the next external charging time, when an SOC value becomes equal to or smaller than a predetermined lower threshold, said SOC value being a value relating to the state of charge of the battery.

In the above-described hybrid vehicle, the electric motor can generate driving force using electrical power supplied to it. Moreover, the electric motor can generate electrical power when driven by the internal combustion engine. In the present disclosure, one electric motor may generate driving force using electrical power supplied to it and generate electrical power when driven by the internal combustion engine. Alternatively, an electric motor (motor) that generates driving force using electrical power supplied to it and another electric motor (generator) that generates electrical power when driven by the internal combustion engine may be provided separately.

The above-described hybrid vehicle runs in EV mode when the SOC value is larger than the predetermined lower threshold and the required drive load of the vehicle is relatively low. When the SOC value is equal to or smaller than the predetermined lower threshold and the vehicle does not stay at the predetermined charging site, the battery in the above-described hybrid vehicle can be charged by executing the generation control by the controller.

If electrical power generation by the electric motor using the internal combustion engine is controlled on the basis of the distance between the current location of the vehicle and the predetermined charging site, the above-described problem with prior art may arise. Therefore, technology of controlling the SOC value not only on the basis of the distance has been demanded.

The control apparatus for a hybrid vehicle according to the present disclosure acquires an external charging time, which is defined as a time at which external charging of the vehicle becomes possible at the predetermined charging site. The above-described control apparatus may acquire an external charging time by learning based on the state of operation of the vehicle, as described later. Alternatively, an external charging time that is determined by a known method may be directly input to the above-described control apparatus. The generation control is performed on the basis of the remaining time, which is defined as the length of time from the current time to the next external charging time. As above, the present disclosure provides a technology of controlling the SOC value on the basis of the remaining time. According to the present disclosure, when the SOC value becomes equal to or smaller than the predetermined lower threshold, the generation control is executed on the basis of the remaining time. This can reduce the degree of dependence on the internal combustion engine as much as possible.

The aforementioned controller may acquire the aforementioned external charging time on the basis of specific operation information about the state of operation of said hybrid vehicle. The specific operation information is, for example, information about running and stopping of the hybrid vehicle. The control apparatus for a hybrid vehicle according to the present disclosure can acquire the specific operation information as such by, for example, monitoring the state of operation of the vehicle. Alternatively, the specific operation information may be input to the aforementioned control apparatus on the basis of a running schedule of a user or the like. The controller acquires an external charging time by learning based on the specific operation information. Thus, the controller can acquire an external charging time based on the pattern of operation of the vehicle. In consequence, the generation control is executed with appropriate timing. Thus, the degree of dependence on the internal combustion engine can be reduced as much as possible. Moreover, it is not necessary for the user of the vehicle to enter an external charging time to the aforementioned control apparatus every time. Thus, the convenience for the user is improved.

The aforementioned specific operation information may be information on the time of external charging of said hybrid vehicle in the past. In that case, the controller can learn an external charging time relatively easily.

With the above-described control apparatus for a hybrid vehicle, external charging can be performed with the vehicle staying at a predetermined charging site, even if the running of the vehicle of the day has not ended. In other words, plurality of external charging times in a day can be acquired. In that case, external charging may not be carried out at or around an acquired external charging time that is earlier than the end of running of the vehicle of the day in some actual situations of operation of the vehicle. In such cases, there is a possibility that the generation control based on the remaining time associated with this external charging time may not be performed appropriately.

To solve this problem, the control apparatus for a hybrid vehicle according to the present disclosure, wherein said controller may be further configured to determine the end of running of said hybrid vehicle of a day. Moreover, the controller may acquire said external charging time using, as said specific operation information, the time of the end of running of said hybrid vehicle of a day determined. Thus, an external charging time is acquired on the basis of the time of the end of running of the vehicle of the day. Then, the probability that external charging is actually performed at or around the acquired external charging time is high. Therefore, it is possible to perform the generation control based on the remaining time associated with this external charging time appropriately.

In the above-described control apparatus for a hybrid vehicle, said controller may control electrical power generation in such a way that the SOC value at the time of completion of said generation control is made larger when said remaining time is long than when it is short. This can reduce the frequency of start and stop of the internal combustion engine, thereby making it possible to reduce the degree of dependence on the internal combustion engine as much as possible.

Said controller may make said predetermined lower threshold smaller when said remaining time is short than when it is long. In the above-described hybrid vehicle, the state of charge of the battery is normally controlled in such a way that the SOC value is kept larger than the predetermined lower threshold, in order to protect the battery. If the predetermined lower threshold is reduced to a smaller value, the vehicle can continue running in EV mode longer than in the case where the predetermined lower threshold is not reduced. For this reason, in the above-described hybrid vehicle, in the case where the remaining time is short, the predetermined lower threshold is reduced to a value smaller than that in the case where the remaining time is long. This can reduce the frequency of start and stop of the internal combustion engine while protecting the battery, thereby making it possible to reduce the degree of dependence on the internal combustion engine as much as possible.

Moreover, in the case where the remaining time is equal to or shorter than a predetermined time, said controller may reduce said predetermined lower threshold to a value smaller than the value of said predetermined lower threshold in the case where said remaining time is longer than said predetermined time. The aforementioned predetermined time is set to a relatively short time. This means that the controller reduces the predetermined lower threshold in a period near the external charging time. Then, the hybrid vehicle tends to run to the predetermined charging site without causing the internal combustion engine to operate. Thus, the hybrid vehicle runs in EV mode as long as possible. This can reduce the frequency of start and stop of the internal combustion engine, thereby making it possible to reduce the degree of dependence on the internal combustion engine as much as possible.

The control apparatus for a hybrid vehicle according to the present disclosure, wherein said controller may be further configured to record said specific operation information. Moreover, the controller may acquire said external charging time on the basis of a history of said specific operation information over a plurality of days recorded. In that case, the controller can acquire an external charging time based on the pattern of operation of the vehicle in a plurality of days in the past. In consequence, the generation control is executed with appropriate timing. Thus, the degree of dependence on the internal combustion engine can be reduced as much as possible.

The present disclosure also provides a control system for a hybrid vehicle including the above-described control apparatus for a hybrid vehicle and a server apparatus. The control system for a hybrid vehicle comprises the control apparatus for a hybrid vehicle and the server apparatus. Said server apparatus may comprise a server's communicator for communication, and a server's controller comprising at least one processor configured to record said specific operation information received by said server's communicator, and calculate said external charging time on the basis of a history of said specific operation information over a plurality of days recorded. Said control apparatus for a hybrid vehicle may comprise a vehicle's communicator for communicating with said server apparatus. Said controller may acquire said external charging time by receiving said external charging time from said server.

The present disclosure can reduce the dependence on the internal combustion engine as much as possible.

BRIEF DESCRIPTION OF DRAWINGS

FIG. 1 is a diagram showing the general configuration of a hybrid vehicle according to a first embodiment of the present disclosure.

FIG. 2 is a flow chart of a process of recording the state of operation of the hybrid vehicle.

FIG. 3 is a graph showing start times and end times recorded in the ECU in an exemplary case.

FIG. 4 is a flow chart of a process of calculating a representative operation pattern of the hybrid vehicle.

FIG. 5 is a diagram illustrating a representative pattern.

FIG. 6 is a flow chart of a control process that is executed by a control apparatus for the hybrid vehicle according to the first embodiment when charging the battery using the internal combustion engine.

FIG. 7 is a graph illustrating the method of calculating SOCtgt.

FIG. 8 is a graph showing an example of information about the charging time in the past recorded in the ECU.

FIG. 9 is a second graph showing start times and end times recorded in the ECU in an exemplary case.

FIG. 10 is a flow chart of a control process that is executed by the control apparatus for the hybrid vehicle according to a second embodiment of the present disclosure when charging the battery using the internal combustion engine.

FIG. 11 is a flow chart of a control process executed by the control apparatus for the hybrid vehicle according to a modification of the second embodiment of the present disclosure when charging the battery using the internal combustion engine.

FIG. 12A is a graph showing a history of the state of operation of the internal combustion engine and the SOC value in a case where the reduction of a predetermined lower threshold is not performed.

FIG. 12B is a graph showing the history of the state of operation of the internal combustion engine and the SOC value in a case where the reduction of the predetermined lower threshold is performed.

FIG. 13 is a diagram showing the general configuration of a control system for a hybrid vehicle according to a third embodiment of the present disclosure.

DESCRIPTION OF EMBODIMENTS

In the following, modes for carrying out the present disclosure will be described with reference to the drawings. The dimensions, materials, shapes, relative arrangements, and other features of the components that will be described in connection with embodiments are not intended to limit the technical scope of the present disclosure only to them, unless otherwise stated.

First Embodiment (Configuration of Hybrid Vehicle)

FIG. 1 is a diagram showing the general configuration of a hybrid vehicle according to a first embodiment. The hybrid vehicle 10 shown in FIG. 1 has an internal combustion engine 1 and motor-generators MG1, MG2 as driving sources. The motor generators MG1, MG2 are known synchronous motors that can be driven by three-phase alternating current as motors and driven as electric generators. In this embodiment one motor generator MG, which is mainly used as a generator, will be referred to as "generator MG1", and the other motor generator MG2, which is mainly used as a motor, will be referred to as "motor MG2".

Besides the aforementioned components, the major components of the hybrid vehicle 10 include a power splitting system 12, a decelerator 16, an electronic control unit (ECU) 20, a power control unit (PCU) 21, a battery 22, and a charging plug 23. As shown in FIG. 1, the crankshaft of the internal combustion engine 1 is connected to an output shaft 13, which in turn is connected to the power splitting system 12. The power splitting system 12 is connected with the generator MG1 through a power transmission shaft 14 and with the motor MG2 through a power transmission shaft 15. The power splitting system 12 uses a known planetary gear mechanism (not shown) to distribute and gather the mechanical power of the internal combustion engine 1, the generator MG1, and the motor MG2. The power transmission shaft 15 is connected with a reduction gear 16, and the output of the driving source is transmitted to a drive shaft 17 through the reduction gear 16. Thus, the drive wheels 18 connected with the drive shaft 17 are driven to cause the hybrid vehicle 10 to run.

The PCU 21 is electrically connected with the generator MG1, the motor MG2, and the battery 22. The PCU 21 includes an inverter (not shown) and is configured in such a way as to be capable of converting DC (direct current) power provided by the battery 22 into AC (alternating current) power and converting AC power generated by the generator MG1 and the motor MG2 into DC power. For instance, when the generator MG1 is driven by the internal combustion engine 1 via the power splitting system 12, the generator MG1 generates AC power. The motor MG2 can perform what is called regeneration when it receives axial rotation of the power transmission shaft 15 during deceleration of the vehicle, where the motor MG2 operates as a generator. Thus, the motor MG2 generates AC power by regeneration. The PCU 21 can convert the AC power thus generated into DC power and supply it to the battery 22. The PCU 21 can also convert DC power supplied from the battery 22 into AC power and supply it to the generator MG1 and the motor MG2.

The hybrid vehicle 10 is what is called a plugin hybrid vehicle. Thus, when the hybrid vehicle 10 stays at a certain charging site, the battery 22 can be externally charged with connection of a connector communicating with an external power source 30 to the charging plug 23.

The hybrid vehicle 10 configured as above is provided with the ECU 20, which controls the internal combustion engine 1 and the PCU 21. The ECU 20 is an electronic control unit including a CPU, a ROM, a RAM, and a backup RAM. The ECU 20 is connected, by electric wiring, with various sensors such as a vehicle speed sensor that acquires the vehicle speed, an SOC sensor that acquires the state of charge (SOC) of the battery 22, a crank position sensor that acquires the engine speed of the internal combustion engine 1, an accelerator opening degree sensor that acquires the accelerator opening degree, and a brake pedal position sensor that acquires the brake pedal position corresponding to the amount of depression of the brake pedal. Signals output from these sensors are input to the ECU 20.

The ECU 20 recognizes the operation states of the internal combustion engine 1, the generator MG1, the motor MG2, and the battery 22 on the basis of the output signals of these sensors and optimizes the running mode of the hybrid vehicle 10 on the basis of the operation states of these components. For example, when the required drive load of the hybrid vehicle 10 is relatively large, the ECU 20 causes the hybrid vehicle 10 to run in the mode in which the output of the internal combustion engine 1 and the output of the motor MG2 are used as the drive source. Furthermore, for example when the remaining capacity of the battery 22 is relatively large and the required drive load of the hybrid vehicle 10 is relatively small, the ECU 20 causes the hybrid vehicle 10 to run in the mode in which only the output of the motor MG2 is used as the drive source with the internal combustion engine 1 turned off. In such EV mode running, either only the output of the motor MG2 or the output of both the generator MG1 and the motor MG2 may be used as the drive source.

(External Charging Time Acquisition Process)

In the control apparatus for the hybrid vehicle according to this embodiment, the ECU 20 acquires a time at which charging of the battery 22 by electrical power supplied by the external power source 30 becomes possible with the hybrid vehicle 10 staying at a predetermined charging site. Such time will be also be referred to as "external charging time" hereinafter. In the following, a process of acquiring an external charging time (external charging time acquisition process) executed by the ECU 20 in this embodiment will be described. In executing the external charging time acquisition process, the ECU 20 functions as the controller according to the present disclosure.

FIG. 2 is a flow chart of a process of recording the state of operation of the hybrid vehicle 10. In this embodiment, the ECU 20 executes this process at predetermined calculation intervals all day, and information acquired by this process over a plurality of days is recorded in the RAM of the ECU 20.

In this process, firstly in step S101, it is determined whether or not a recording request is made, which is a request for recording the operation state of the hybrid vehicle 10. In step S101, specifically, it is determined that a recording request is made, if an external charging time has not been acquired yet. Moreover, when a recording request is entered through known interface by a user of the vehicle, it is determined that the recording request is made, even if an external charging time has been acquired. If an affirmative determination is made in step S101, the ECU 20 executes the processing of step S102 next. If a negative determination is made in step S101, the execution of this process is terminated.

If an affirmative determination is made in step S101, then in step S102, a cumulative number of days of learning Ns is acquired. The cumulative number of days of learning is reset to 0 before the processing of S102 is executed for the first time, and it is set to 1 (Ns=1) when the processing of step S102 is executed for the first time. If an external charging time has already been acquired and a recording request is entered by the user of the vehicle through known interface, the cumulative number of days of learning Ns is reset to 0 before recording is performed in response to the request. Then, in step S103, it is determined whether or not an update to the cumulative number of days of learning Ns has been made. As described above, this process is executed repeatedly at predetermined calculation intervals all day, and after change of the date, the value of the cumulative number of days of learning Ns acquired in step S102 is incremented by 1 from the value of the previous day. In that case, it is determined that an update to the cumulative number of days of learning Ns has been made in step S103. If it is once determined that an update to the cumulative number of days of learning Ns has been made, the determination that an update to the cumulative number of days of learning Ns has been made will not be made in step S103 any more on the same day. If an affirmative determination is made in step S103, the ECU 20 executes the processing of step S104 next. If a negative determination is made in step S103, the ECU 20 executes the processing of step S105.

If an affirmative determination is made in step S103, then in step S104 a counter Ni is reset to 0. The counter Ni counts the number of times of turning on the drive system of the hybrid vehicle 10 in one day, as will be described later. The drive system of the vehicle 10 will also be simply referred to as the "drive system" hereinafter.

Then in step S105, it is determined whether or not the drive system is on. Specifically, in step S105, an affirmative determination is made, for example, if the power of the system of the vehicle 10 is on to enable the hybrid vehicle 10 to operate. If an affirmative determination is made in step S105, the ECU 20 executes the processing of step S106 next. If a negative determination is made in step S105, the execution of this process is terminated.

If an affirmative determination is made in step S105, then in step S106, the counter Ni is incremented by 1. Then, in step S107, start time Ts(Ns, Ni) is recorded. The start time Ts(Ns, Ni) is the current time at the time when the processing of step S107 is executed. This start time Ts is recorded in the RAM of the ECU 20 as a two-dimensional array of the cumulative number of days of learning Ns and the counter Ni. For example, the time of the fifth turning-on of the drive system in the third day of learning is recorded as Ts(3, 5).

Then, in step S108, the drive output Vout of the hybrid vehicle 10 is calculated. The drive output of the hybrid vehicle 10 will also simply be referred to as the "drive output" hereinafter. In step S108, the drive output Vout may be calculated using a known technique. In step S109, the integrated value Vsum(Ns) of the driving work of the hybrid vehicle 10 is calculated. This integrated value will also be referred to as the "integrated work" hereinafter. The integrated work Vsum is defined as a one-dimensional array of the cumulative number of days of learning Ns. In step S109, specifically, the integrated work Vsum(Ns) is calculated by integrating the product of the drive output Vout calculated in step S108 and the cycle $\Delta t$ of calculation of the drive output Vout.

Then, in step S110, it is determined whether or not the drive system is turned off. If an affirmative determination is made in step S110, the ECU 20 executes the processing of step S111 next. If a negative determination is made in step S110, the ECU 20 returns to the processing of step S108.

If an affirmative determination is made in step S110, then in step S111, end time Te(Ns, Ni) is recorded. The end time Te(Ns, Ni) is the current time at the time when the processing of step S111 is executed. The end time Te is recorded in the RAM of the ECU 20 as a two-dimensional array of the cumulative number of days of learning Ns and the counter Ni as with the start time Ts. After the completion of the processing of step S111, the execution of this process is ended.

By the execution of the above-described process, the start time Ts(Ns, Ni) and the end time Te(Ns, Ni) are recorded in the ECU 20. In this embodiment, the start time Ts(Ns, Ni) and the end time Te(Ns, Ni) constitute the specific operation information according to the present disclosure. In recording these values, the ECU 20 functions as the controller according to the present disclosure.

FIG. 3 is a graph showing start times Ts(Ns, Ni) and end times Te(Ns, Ni) recorded in the ECU 20 in an exemplary case. In FIG. 3, the integrated work Vsum and the drive output Vout are also shown additionally for reference.

As shown in FIG. 3, in the first day of learning (Ns=1), the time of the first turning-on of the drive system is 6:00, and the time of the first turning-off is 7:00. Put another way, the start time Ts(1, 1) is 6:00, and the end time Te(1, 1) is 7:00. Moreover, the time of the sixth turning-off of the drive system (Ni=6) in the first day of learning is 18:00, namely the end time Te(1, 6) is 18:00. In this way, the pattern of operation of the hybrid vehicle 10 in a day is recorded in the ECU 20. The integrated work Vsum associated with such a pattern of operation can be used in calculation of a target SOC in charging the battery 22 by the power generated by the generator MG1, as will be described later.

As shown in FIG. 3, the ECU 20 may record start times Ts(Ns, Ni) and end times Te(Ns, Ni) over a plurality of days. However, this embodiment is not limited to this. The ECU 20 may record start times Ts(Ns, Ni) and end times Te(Ns, Ni) only one day.

In the external charging time acquisition process according to this embodiment, the external charging time is acquired by learning on the basis of the aforementioned information recorded in the ECU 20. FIG. 4 is a flow chart of a process of calculating a representative operation pattern of the hybrid vehicle 10 (which will also be referred to as the "representative pattern" hereinafter). In this embodiment, the ECU 20 executes this process, for example, once in a day at a predetermined time.

In this process, firstly in step S201, the cumulative number of days of learning Ns is acquired. Then, in step S202, it is determined whether or not the cumulative number of days of learning Ns acquired in step S201 is equal to a required number of days of learning Nsrq. The required number of days of learning Nsrq is a certain number of days required to learn a representative pattern. This value Nsrq is stored in the ROM of the ECU 20 in advance. If an affirmative determination is made in step S202, the ECU 20 executes the processing of step S203 next. If a negative determination is made in step S202, the execution of this process is terminated.

If an affirmative determination is made in step S202, then in step S203, the frequency of driving F(t) is calculated. The frequency of driving F(t) represents the frequency of turned-on of the drive system at time t. This will be described below with reference to FIG. 5, which is a diagram illustrating a representative pattern. As shown in FIG. 5, on all of the first to fifth days of learning, the drive system is on in a time slot from 8:30 to 9:00. Only in the second day of learning, the drive system is on in a period of time before 8:30. In this case, the frequency of driving F in the period of time before 8:30 is lower than the frequency of driving F in the time slot from 8:30 to 9:00. In step S203, the frequency of driving F as such at every time is calculated.

Then, in step S204, it is determined whether or not the frequency of driving F(t) calculated in step S203 is equal to or higher than a threshold frequency Fth. The threshold frequency Fth is determine in advance and stored in the ROM of the ECU 20. If an affirmative determination is made in step S204, the ECU 20 executes the processing of step S205 next, where a flag nflag(t) is set to 1. If a negative determination is made in step S204, the ECU 20 executes the processing of step S206 next, where the flag nflag(t) is set to 0. After the completion of the processing of step S205 or S206, the execution of this process is ended.

The representative pattern determined as a result of the processing of steps S204 to S206 will be described with reference to FIG. 5. As will be seen from the history of frequency of driving F and the history of the flag nflag in FIG. 5, the flag nflag is 1 during the times when the frequency of driving F is equal to or higher than the threshold frequency Fth. In other words, the threshold frequency Fth is the threshold of determination as to whether to set the flag nflag or not. The ECU 20 sets a representative pattern in which the drive system is on during the times when the flag nflag is 1. In the illustrative case shown in FIG. 5, a representative pattern is set on the basis of the patterns of operation of the vehicle in five days. In other words, the required number of days of learning is five. However, this embodiment is not limited to this. The required number of days of learning may be larger or smaller than five. It may be as small as one.

Once the representative pattern is acquired by learning, the ECU 20 can acquire an external charging time. For example, in the history of the flag nflag shown in FIG. 5, the flag nflag is 0 during the time from 11:00 to 13:00. In other words, in the representative pattern based on the history shown in FIG. 5, the drive system is off during the time from 11:00 to 13:00. In that case, the duration of the time during which the drive system is off is relatively long (for example, this period of time is longer than the time required for quick external charging of the battery). Hence, the ECU 20 recognizes that external charging can be performed during this period of time and can learn that the external charging time is 11:00. In the aforementioned representative pattern, furthermore, the running of the vehicle of the day ends at 17:30. Hence, the ECU 20 can acquire 11:00 and 17:30 as external charging times. In the process of acquiring a representative pattern by learning, information on the location of the vehicle is also acquired using known technology with learning of the on-and-off status of the drive system. This enables a determination to be made as to whether or not the vehicle stays at the predetermined charging site when the drive system is off. Thus, an external charging time can be acquired by learning appropriately.

In the above description of the external charging time acquisition process, we have described a case where a representative pattern is acquired by learning patterns of operation of the hybrid vehicle 10 in the past, and external charging times are learned on the basis of the representative pattern. Alternatively, the ECU 20 may learn external charge times on the basis of a running schedule of the user of the vehicle. In that case, the running schedule of the user of the vehicle is input to the ECU 20.

(Generation Control)

When the SOC value representing the charge state of the battery 22 becomes equal to or smaller than a predetermined lower threshold in the state in which the hybrid vehicle 10 is not charged externally, the ECU 20 drives the generator MG1 using the internal combustion engine 1 to charge the battery 22. In the control apparatus for the hybrid vehicle according to this embodiment, the ECU 20 controls the electrical power generation by the generator MG1 using the internal combustion engine 1 on the basis of the remaining time from the current time to the next external charging time. This control process will be referred to as the "generation control" hereinafter. The generation control executed by the ECU 20 in this embodiment will be described in the following. In executing the generation control, the ECU 20 functions as the controller according to the present disclosure.

FIG. 6 is a flow chart of a control process that is executed by the control apparatus for the hybrid vehicle according to this embodiment when charging the battery 22 using the internal combustion engine 1. In this embodiment, this control process is executed by the ECU 20 at predetermined calculation intervals while the hybrid vehicle 10 is running. As will be described later, when an external charging time tcrg has not been acquired yet, the battery 22 cannot be charged even if this process is executed. In that case, the battery 22 is charged using known technology.

In this process, firstly in step S301, it is determined whether or not the acquisition of an external charging time tcrg has been completed. The external charging time tcrg is acquired by executing the above-described external charge time acquisition process. However, the method of acquiring an external charge time tcrg in this embodiment is not limited to this. For example, an external charge time tcrg may be entered directly into the ECU 20 by the user of the vehicle. If an affirmative determination is made in step S301, the ECU 20 executes the processing of step S302 next. If a negative determination is made in step S301, the execution of this process is terminated.

If an affirmative determination is made in step S301, then in step S302, the current SOC value of the battery 22 is acquired. This value will be referred to as SOCnow. In step S302, specifically, SOCnow is acquired on the basis of the output signal of the SOC sensor. Then, in step S303, it is determined whether or not SOCnow acquired in step S302 is equal to or smaller than a predetermined lower threshold SOClth. The predetermined lower threshold SOClth is a lower limit of the SOC value that is set for the purpose of protecting the battery 22. If an affirmative determination is made in step S303, the ECU 20 executes the processing of step S304 next. If a negative determination is made in step S303, the execution of this process is terminated.

If an affirmative determination is made in step S303, then in step S304, the next external charging time tcrgn is read in. Then, in step S305, it is determined whether or not the current time is earlier than the next external charging time tcrgn. If an affirmative determination is made in step S305, the ECU 20 executes the processing of step S306 next. If a negative determination is made in step S305, the ECU 20 executes the processing of step S312 next.

If an affirmative determination is made in step S305, then in step S306, the remaining time trm is calculated, which is the length of time from the current time to the next external charging time tcrgn. Then, in step S307, SOCtgt is calculated, which is a target value of the SOC value after the generation control. In step S307, specifically, SOCtgt is calculated on the basis of the remaining time trm calculated in step S306. This calculation will be specifically described in the following with reference to FIG. 7.

FIG. 7 is a graph illustrating the method of calculating SOCtgt. In the case shown in FIG. 7, it is assumed that external charging times 11:00 and 17:30 have been acquired. In FIG. 7, the drive work that is expected to be done by the hybrid vehicle 10 by the external charging time (which will also be referred to as the "remaining work" hereinafter) at every time is also shown. The remaining work can be calculated from the above-described integrated work Vsum. Specifically, the remaining work can be calculated by preparing the history of the integrated work Vsum associated with the aforementioned representative pattern by learning and subtracting the integrated work Vsum at each time from the integrated work Vsum at the external charging time.

In the history of the remaining work in FIG. 7, Vth is the driving work that can be achieved by running in EV mode if the SOC value is at its upper limit SOCuth. Therefore, when the remaining work is larger than or equal to Vth, the SOCtgt is calculated equal to SOCuth, as shown in FIG. 7. During the periods from time t1 to 11:00 and time t2 to 17:30 in which the remaining work is smaller than or equal to Vth, the shorter the remaining time is, the smaller SOCtgt is calculated.

While SOCtgt is calculated using the remaining work in this embodiment, the calculation of SOCtgt is not limited to this method. SOCtgt may be calculated only on the basis of the remaining time. In that case also, the shorter the remaining time is, the smaller SOCtgt is calculated.

Referring back to FIG. 6, after the processing of step S307 mentioned above is executed, in step S308, the ECU 20 causes the internal combustion engine 1 to operate to drive the generator MG1, thereby charging the battery 22. In step S308, if the hybrid vehicle 10 has been running in EV mode, the internal combustion engine 1 is started at the time when this processing is executed. While the battery 22 is being charged by the execution of this process, the operation of the internal combustion engine 1 continues in step S308.

Then, in step S309, SOCnow is updated. In step S309, SOCnow is acquired in the same manner as in the processing of step S302 to update its value. Then, in step S310, it is determined whether or not SOCnow updated in step S309 is equal to or larger than SOCtgt calculated in step S307. If an affirmative determination is made in step S310, the ECU 20 executes the processing of step S311 next. If a negative determination is made in step S310, the ECU 20 returns to the processing of step S308.

If an affirmative determination is made in step S310, then in step S311, the internal combustion engine 1 is turned off to end charging of the battery 22. After the completion of the processing of step S311, the execution of this process is ended.

If a negative determination is made in step S305, then in step S312, the distance drm between current location of the hybrid vehicle 10 and a predetermined charging site is calculated. The current location of the vehicle can be acquired using known technology. Then, in step S313, SOCtgt is calculated on the basis of the distance drm calculated in step S312. In step S313, SCOtgt can be calculated using known technology (e.g. technology disclosed in prior art literatures). After the completion of the processing of step S313, the ECU 20 executes the processing of step S308 next.

Executing the above-described process by the control apparatus for the hybrid vehicle according to this embodiment enables a reduction of the frequency of start and stop of the internal combustion engine 1. For example, even in cases where the hybrid vehicle 10 running near the predetermined charging site continues running without returning to the charging site, if the generation control is executed based on the remaining time trm, generation is controlled in such a way as to make the SOC value after the completion of the generation control larger when the remaining time trm is long than when it is short. This leads to a reduction of the frequency of start and stop of the internal combustion engine 1. Thus, the degree of dependence on the internal combustion engine 1 can be reduced as much as possible.

First Modification of First Embodiment

Next, a first modification of the above-described first embodiment will be described. In the following description of the first modification, the features and control process that are substantially the same as those in the first embodiment will not be described in further detail.

In the first embodiment, a representative pattern is acquired by learning, and external charging times are acquired on the basis of this representative pattern, as described before with reference to FIG. 5. On the other hand, in the first modification, the ECU 20 acquires external charging times on the basis of information about the time of charging of the hybrid vehicle 10 in the past. This will be described in the following.

FIG. 8 is a graph showing an example of information about the time of charging in the past recorded in the ECU 20. In the case shown in FIG. 8, external charging was performed from 11:00 to 13:00 and after 17:30 on all of the first to fifth days of learning. In this case, the ECU 20 can acquire 11:00 and 17:30 as external charging times by learning. Learning of external charging times may be performed taking account of the frequency of external charging, as described above with the case shown in FIG. 5.

Second Modification of First Embodiment

A second modification of the above-described first embodiment will be described next. In the following description of this modification, the features and control process that are substantially the same as those in the first embodiment will not be described in further detail.

In the case of the control apparatus for the hybrid vehicle according to the first embodiment, external charging becomes possible with the vehicle staying at a certain charging site, even when the running of the hybrid vehicle 10 of a day has not ended. Therefore, as described in the description of the case shown in FIG. 5, a plurality of times (e.g. 11:00 and 17:30) of a day are acquired as external charging times. However, in some actual situations of operation of the vehicle, external charging is not or cannot be carried out at or around the external charging time 11:00. In such cases, there is a possibility that generation control based on the remaining time associated with this external charging time (11:00) may not be performed appropriately.

To solve this problem, in this modification, the ECU 20 is configured to acquire an external charging time on the basis of information on the end of running of the hybrid vehicle 10 in the past. This will be specifically described in the following.

FIG. 9 is a graph similar to FIG. 3 showing start times Ts(Ns, Ni) and end times Te(Ns, Ni) recorded in the ECU 20 in an exemplary case. In this modification, as in the first embodiment, the pattern of operation of the hybrid vehicle 10 in a day is recorded in the ECU 20. Moreover, in this modification, the ECU 20 extracts the time of the end of running of the hybrid vehicle 10 from the recorded pattern of operation. In this case, the latest time among the times at which the drive system is turned off in a day is extracted as the time of end of running. An external charging time is acquired by learning based on the extracted time of the end of running. For example, as shown in FIG. 9, in the case where the frequency of the end of running of the hybrid vehicle 10 in the past is highest at 17:30, the ECU 20 can learn 17:30 as the external charging time. Then, the probability that external charging is actually performed at or around the learned external charging time is high. Thus, generation control based on the remaining time associated with this external charging time can be performed appropriately.

Second Embodiment

Next, a second embodiment of the present disclosure will be described. In the control apparatus for a hybrid vehicle according to the second embodiment, the ECU 20 is configured to make the lower threshold SOClth smaller when the remaining time is short than when it is long. This will be described specifically in the following with reference to FIG. 10.

FIG. 10 is a flow chart of a control process that is executed by the control apparatus for the hybrid vehicle according to the second embodiment when charging the battery 22 using the internal combustion engine 1. In this embodiment, this process is executed by the ECU 20 in a manner similar to the above-described process shown in FIG. 6. Processing in FIG. 10 that is substantially the same as the processing shown in FIG. 6 is denoted by the same reference signs to eliminate detailed description thereof. Moreover, features in this embodiment that are substantially the same as those in the first embodiment will not be described in further detail.

In the control process shown in FIG. 10, after the completion of the processing of step S306, the lower threshold SOClth is updated in step S401. In step S401, the lower threshold SOClth is calculated as a function of the remaining time trm calculated in step S306. Specifically, the lower threshold SOClth is made smaller when the remaining time is short than when it is long.

Then, in step S402, it is determined whether or not SOCnow acquired in step S302 is equal to or smaller than the lower threshold SOClth updated in step S401. If an affirmative determination is made in step S402, the ECU 20 executes the processing of step S307 next. In that case, the battery 22 is charged using the internal combustion engine 1 in the processing of step S307 and the subsequent steps. On the other hand, if a negative determination is made in step S402, the execution of this process is terminated. In that case, in other words, charging of the battery 22 using the internal combustion engine 1 is not performed in this execution of the control process.

In the process shown in FIG. 10, SOCtgt is calculated on the basis of the remaining time trm in the processing of step S307, as in the first embodiment. However, this embodiment is not limited to this. What is essential in this embodiment is that the lower threshold SOClth is made smaller when the remaining time trm is short than when it is long. SOCtgt may be calculated employing known technology.

Updating the lower threshold SOClth as above helps continuing running of the hybrid vehicle 10 in EV mode. Thus, the degree of dependence on the internal combustion engine 1 can be reduced as much as possible.

Modification of Second Embodiment

Next, a modification of the above-described second embodiment will be described. In the control apparatus for a hybrid vehicle according to this modification, in the case where the remaining time is equal to or shorter than a predetermined time, the ECU 20 reduces the lower threshold SOClth to a value smaller than that in the case where the remaining time is longer than the predetermined time. This will be specifically described in the following.

FIG. 11 is a flow chart of a control process executed by the control apparatus for the hybrid vehicle according to this modification when charging the battery 22 using the internal combustion engine 1. In this modification, this process is executed by the ECU 20 in a manner similar to the above-described process shown in FIG. 6. Processing in FIG. 11 that is substantially the same as the processing shown in FIG. 6 is denoted by the same reference signs to eliminate detailed description thereof. Moreover, features in this modification that are substantially the same as those in the first embodiment will not be described in further detail.

In the control process shown in FIG. 11, after the completion of the processing of S306, it is determined in step S501 whether or not the remaining time trm calculated in step S306 is equal to or shorter than a predetermined time trmth. The value of the predetermined time trmth is stored in the ROM of the ECU 20 in advance. If an affirmative determination is made in step S501, the ECU 20 executes the processing of step S502 next. If a negative determination is made in step S501, the ECU 20 executes the processing of step S307 next.

If an affirmative determination is made in step S501, then in step S502, the lower threshold SOClth is updated. In step S502, the lower threshold SOClth is set to a second lower threshold SOClth2. The second lower threshold SOClth2 is a value smaller than the predetermined lower threshold set in the case where the remaining time trm is longer than the predetermined time trmth (the latter lower threshold will be referred to as the first lower threshold SOClth).

Then, in step S503, it is determined whether or not SOCnow acquired in step S302 is equal to or smaller than the lower threshold SOClth updated in step S502. If an affirmative determination is made in step S503, the ECU 20 executes the processing of step S307 next. In that case, the battery 22 is charged using the internal combustion engine 1 in the processing of step S307 and the subsequent steps. On the other hand, if a negative determination is made in step S503, the execution of this process is terminated. In that case, in other words, charging of the battery 22 using the internal combustion engine 1 is not performed in this execution of the control process.

In the following, a case where the reduction of the lower threshold SOClth described above with reference to FIG. 11 is performed and a case where the reduction is not performed will be discussed in comparison, with reference to FIGS. 12A and 12B. FIG. 12A is a graph showing the history of the state of operation of the internal combustion engine 1 and the SOC value in a case where the reduction of the lower threshold SOClth is not performed. FIG. 12B is a graph showing the history of the state of operation of the internal combustion engine 1 and the SOC value in a case where the reduction of the lower threshold SOClth is performed. In FIG. 12B, the history of the remaining time is also shown. In both the cases shown in FIGS. 12A and 12B, an acquired external charging time is 17:30.

In the case shown in FIG. 12A where the reduction of the lower threshold SOClth is not performed, the lower threshold SOClth is constant at the first lower threshold SOClth1. As shown in FIG. 12A, the internal combustion engine 1 starts to operate at time t3 at which the SOC value reaches the lower threshold SOClth. This time t3 is relatively close to the external charging time 17:30. At such a time, the user of the vehicle tends to expect that the vehicle will continue running in EV mode until the end of running. Therefore, it is desirable to prevent the occurrence of a situation in which the internal combustion engine 1 starts to operate at such a time to generate noise and vibration.

In the case shown in FIG. 12B where the lower threshold SOClth is reduced, the internal combustion engine 1 does not start to operate at the aforementioned time. In the case shown in FIG. 12B, specifically, the aforementioned predetermined time is set to 0.5 hour, and the lower threshold SOClth is reduced from the first lower threshold SOClth1 to the second lower threshold SOClth2 at 17:00 at which the remaining time until the external charging time 17:30 becomes equal to this predetermined time (0.5 hour). In consequence, the SOC value is larger than the lower threshold SOClth at time t3 shown in FIG. 12A. Thus, in the case shown in FIG. 12B, the hybrid vehicle 10 continues to run in EV mode until the external charging time 17:30.

As above, by reducing the lower threshold SOClth so as to continue running of the hybrid vehicle 10 in EV mode as long as possible in a period of time relatively close to the external charging time, it is possible to reduce the degree of dependence on the internal combustion engine 1 as much as possible.

Third Embodiment

Next, a third embodiment of the present disclosure will be described. The above-described first and second embodiments are embodiments of the control apparatus for a hybrid vehicle according to the present disclosure. The third embodiment is an embodiment of a control system for a hybrid vehicle according to the present disclosure.

FIG. 13 is a diagram showing the general configuration of a control system for a hybrid vehicle according to the third embodiment. In this embodiment, the features and components that are substantially the same as those in the first embodiment will not be described in further detail.

The hybrid vehicle 10 is provided with a vehicle's communicator 40. The vehicle's communicator 40 is a device for wireless communication with a server apparatus 50 connected by network. The vehicle's communicator 40 transmits the state of operation of the hybrid vehicle 10 to the server apparatus 50. Furthermore, the vehicle's communicator 40 receives external charging time from the server apparatus 50. The communications can be performed using known wireless communication technology.

The server apparatus 50 includes a server's communicator 51, and a server's controller 52. The server's communicator 51 is a device for wireless communication with the hybrid vehicle 10. The server's controller 52 records the state of operation of the hybrid vehicle 10 received by the server's communicator 51. Furthermore, the controller 52 calculates external charging time on the basis of history of the state of operation of the hybrid vehicle 10 over a plurality of days recorded. The controller 52 may calculate an external charging time using the methods described in the first embodiment and its modifications (see e.g. FIGS. 5, 8, and 9).

The hybrid vehicle 10 can acquire the external charging time calculated by the server apparatus 50 in this way and perform generation control. This system can also reduce the degree of dependence on the internal combustion engine 1 as much as possible.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control apparatus for a hybrid vehicle, the hybrid vehicle being provided with an internal combustion engine and an electric motor, capable of running by driving force generated by the electric motor with the internal combustion engine turned off, capable of charging a battery by electrical power from the electric motor by driving the electric motor by the internal combustion engine, and configured in such a way that the battery can be charged by electrical power supplied from outside the vehicle, the control apparatus comprising:

a controller including at least one processor, the at least one processor being configured to:

acquire an external charging time at which charging of the battery by electrical power supplied from outside the vehicle becomes possible with the hybrid vehicle staying at a predetermined charging site, the external charging time being a time predicted on the basis of a state of operation of the hybrid vehicle in the past or a running schedule of a user of the hybrid vehicle; and execute generation control to control electrical power generation by the electric motor using the internal combustion engine on the basis of a remaining time defined as the length of time from the current time to the time of the next external charging time, when a state of charge (SOC) value becomes equal to or smaller than a predetermined lower threshold, the SOC value being a value relating to the state of charge of the battery, wherein the controller controls electrical power generation in such a way that the SOC value at the time of completion of the generation control is made larger when the remaining time is long than when it is short.

2. A control apparatus for a hybrid vehicle according to claim 1, wherein the controller is further configured to determine the end of running of the hybrid vehicle of a day, wherein the controller acquires the external charging time using as the specific operation information the time of the end of running of the hybrid vehicle of a day determined.

3. A control apparatus for a hybrid vehicle according to claim 1, wherein the controller makes the predetermined lower threshold smaller when the remaining time is short than when it is long.

4. A control apparatus for a hybrid vehicle according to claim 2, wherein the controller makes the predetermined lower threshold smaller when the remaining time is short than when it is long.

5. A control apparatus for a hybrid vehicle according to claim 3, wherein when the remaining time is equal to or shorter than a predetermined time, the controller reduces the predetermined lower threshold to a value smaller than the value of the predetermined lower threshold in the case where the remaining time is longer than the predetermined time.

6. A control apparatus for a hybrid vehicle according to claim 4, wherein when the remaining time is equal to or shorter than a predetermined time, the controller reduces the predetermined lower threshold to a value smaller than the value of the predetermined lower threshold in the case where the remaining time is longer than the predetermined time.

7. A control apparatus for a hybrid vehicle according to claim 1, wherein the controller is further configured to record the specific operation information, wherein the controller acquires the external charging time on the basis of a history of the specific operation information over a plurality of days recorded.

* * * * *